United States Patent [19]

Cudos

[11] Patent Number: 5,676,728

[45] Date of Patent: Oct. 14, 1997

[54] METHOD FOR TRANSMITTING ENERGY TO A PLANT

[76] Inventor: Jose Luis Alegre Cudos, Londres, 21-30-1A, 28028 Madrid, Spain

[21] Appl. No.: 617,180

[22] Filed: Mar. 18, 1996

Related U.S. Application Data

[63] Continuation-in-part of Ser. No. 349,491, Dec. 2, 1994, abandoned.

[51] Int. Cl.$^6$ ..................................................... C05F 5/00
[52] U.S. Cl. ..................................................... 71/26
[58] Field of Search ..................................................... 71/26

[56] References Cited

U.S. PATENT DOCUMENTS 5,549,729  8/1996  Yamashita ..................................................... 71/26

FOREIGN PATENT DOCUMENTS 0232987  12/1987  Japan ..................................................... 71/26

*Primary Examiner*—Ferris Lander
*Attorney, Agent, or Firm*—Ostrolenk, Faber, Gerb & Soffen, LLP

[57] ABSTRACT

A plant or part of a plant with or without roots is placed in contact with a solid and/or liquid nutrient composition which includes a compound which can be or which includes components which can be broken down into a sugar. The plant is able to survive without any or with only minimal supplies of water. It is believed that the nutrient composition increases the process of glycolysis in the plant and therefore increases the storage of adenosine triphosphate (ATP) and other byproducts and thereby permits continued metabolism of the plant without requiring water.

8 Claims, No Drawings

METHOD FOR TRANSMITTING ENERGY TO A PLANT

RELATED APPLICATION

This application is a continuation-in-part of U.S. patent application Ser. No. 08/349,491 which was filed on Dec. 2, 1994 now abandoned.

BACKGROUND OF THE INVENTION

The present invention relates to a method for transmitting energy to an agriculture plant so as to reduce or eliminate the need for providing water to the plant.

Plants require water and nutrients for survival. It is well known that plants undergo a variety of metabolic reactions, including glycolysis and photosynthesis, which require water and which are required for the survival of a plant.

There are many places in the world where the absence of water gives rise to droughts and famine which cause great social and personal suffering. Since there are no currently known methods for growing plants without water and/or without nutrients it is difficult to address these problems. Therefore, plants which do not require any water to survive or which can live under conditions of minimum amounts of water, for example in a desert, would be beneficial.

SUMMARY OF THE INVENTION

It is an object of the present invention to provide a method for growing and/or sustaining plants wherein minimal or no water is provided to the plant.

It is a further object of the present invention to provide a method for activating the photosynthetic and glycolytic reactions of a plant.

Experiments have been performed which show that plants can be grown even if only minimal or no water is provided to the plant. In particular, a plant or plant cutting, with or without roots, is placed in a composition which includes a sugar or a compound which can be or is broken down into a product of a sugar. The sugar is or has been broken down by heating or by exposure to a compound which breaks down the sugar. The composition produces an increase in the metabolism of the plant, thereby reducing or eliminating the need for added water.

DESCRIPTION OF A PREFERRED EMBODIMENT

Experiments have shown that plants can be grown or maintained with minimal or no water by exposing the stem or roots of a plant or plant cutting to a solid and/or liquid nutrient composition which includes a sugar or a sugar product which has been and can be broken down into glucose.

The composition includes a sugar or a product which includes a sugar, such as, for example, milk, a citrus product, sugar cane, or an alcohol; or other products which include carbohydrates, or are broken down into citric acid, lactic acid or which can be metabolized into a sugar. The composition can include some of the constituents of a cell. In addition, the composition can include minimal water, however, water is not required and no water is provided thereafter.

The composition is then exposed to heat or compounds which break down the sugar or cause a change in the state of the sugar so as to produce glucose. Generally, heating the composition to a temperature in the range of approximately 100° to 200° C. for approximately 5 minutes will be sufficient to break down the sugar. During the breakdown process, the composition generally undergoes a change in state, usually from solid to liquid and then rapidly to solid. The composition is then cooled to approximately room temperature or sufficiently so as not to damage the plant.

A plant or plant cutting, with or without the roots, is exposed to the composition, generally at the base of the plant or the cutting or at a portion of the plant which can absorb the composition. The plant or plant cutting can be placed in the composition or the composition can be added to the soil in which the plant is located. If the plant or plant cutting is placed in the composition, it is preferable that a sufficient amount is used to cover up to approximately three centimeters of the stem or the portion of the plant which is positioned in the composition. The plant or plant cutting is exposed to the nutrient composition throughout the life of the plant.

Numerous experiments have been performed with different types of plants, including geraniums, palm trees, "money" plants, potato plants, onion plants, tomato plants and leeks. In addition, different plant structures, i.e. whole plants, with or without roots and plant cuttings, with or without roots have been used.

Initial experiments were performed which involved a simple public garden plant with roots. The plant was placed in the composition and bloomed after a very short time. At the same time, a control plant which was given water had bloomed and withered.

Further experiments were performed on a plant without roots, particularly a geranium cutting. The cutting had a leaf bud which generally will not develop normally without water and/or nutrients. After exposure to the composition, the bud developed and for two weeks, the cutting maintained its conditions of greenness, smoothness and other characteristics. The cutting exposed to the composition was in a condition similar to and even better, in some respects, than that of a geranium planted in normal medium. At the time when the following description was written, the cutting had been alive for 80 days without water and also without receiving nutrients, therefore suggesting that carbohydrates also participate in the process.

The following is an example of the experimental protocol which was followed. Fifteen cuttings were exposed to the nutrient composition and the results were compared to plants grown conventionally.

Leaf cuttings with a stem were obtained from multiple geranium plants. The geranium plants were obtained from a garden.

The nutrient composition was prepared by placing approximately 5 to 10 grams of sugar in a dish. The sugar was then heated to approximately 100° C. for approximately 2–5 minutes or until the sugar was broken down into glucose. The composition was then cooled to approximately room temperature.

The stem of each plant cutting was placed in approximately 3–5 grams of the nutrient composition for the life of the plant. The plant cuttings were grown in a vessel in an open place at room temperature with varying levels of humidity.

The plants grown in the nutrient composition and without added water were generally in the same condition as plants grown in natural medium. The life span of the plant cuttings grown in the nutrient composition was comparable to that of plants grown conventionally.

These experiments show that it is possible for a plant to grow and survive only on a nutrient composition and with the addition of minimal or no water.

Without intending to be limited by theory, it is believed that the following is the mechanism by which the plant is able to be maintained without adding water. Presumably, the composition increases the glycolysis reaction in the plant which produces additional quantities of $H_2O$ and adenosine triphosphate (ATP) which are stored within the plant. This additional $H_2O$ and ATP are used in the photosynthetic reaction in the plant cells. Sufficient additional quantities are produced so as to eliminate the need to add water to a plant for survival.

In particular, the plant absorbs energy from the composition through the process of glycolysis. Glycolysis is a well known sequence of reactions in which glucose is broken down to pyruvate. By this pathway, generally, one molecule of glucose yields two molecules each of pyruvate and NADH and two of ATP. The production of ATP results in the natural production of water ($H_2O$). Therefore, an increase in the glycolytic process results in the increased production and storage of adenosine triphosphate (ATP) and of water, thereby allowing a continuous metabolism in the plant without the need for water. The sugar in the composition initiates the chain reaction which is based on the natural metabolism of the plant cell.

The ATP and $H_2O$ which are naturally present in plant cells are involved in the process of photosynthesis. In the relevant portion of the photosynthetic reaction, ATP and $H_2O$ react to cause the release of a phosphate from ATP, thereby producing adenosine diphosphate (ADP) and causing the release of energy. This energy is used in the photosynthetic process. As the composition described herein produces additional glycolytic reactions in the plant, the quantities of ATP and $H_2O$ which are present within the plant cells are increased and thereby, the photosynthetic process is strengthened. This enables the chain reactions of glycolysis and photosynthesis to continue without the addition of water.

It is believed that this discontinuously cyclical production of energy in the plant cells results from a more specific metabolism in the plant cells.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for growing or maintaining a plant or plant cutting with minimal or no added water, comprising the steps of:

obtaining a nutrient composition including a compound which can be a sugar or which includes components which can be broken down from a sugar by sufficiently heating the composition including a sugar or a product which includes a sugar to break down the sugar or cause a change in the state of the sugar to produce glucose;

cooling the composition so that it would not damage a plant portion placed in the composition;

then placing a nutrient absorbing portion of the plant in the nutrient composition so as to increase the glycolytic reaction and storage of adenosine triphosphate in one or plant cells in the plant so as to permit the continued metabolism of the plant without a supply of water.

2. The method recited in claim 1, wherein the sugar is broken down by applying heat to the nutrient composition until a temperature of between approximately 100° and 200° C. is obtained, for approximately five minutes.

3. The method of claim 2, wherein the composition is a solid prior to the heating.

4. The method of claim 2, wherein the nutrient composition is a material which is capable of changing its state upon obtaining a temperature of between approximately 100°–200° C.

5. The method of claim 2, wherein the nutrient is a liquid nutrient prior to the heating.

6. The method of claim 5, wherein the nutrient composition includes a sugar.

7. The method of claim 5, wherein the nutrient composition includes milk.

8. The method of claim 5, wherein the nutrient composition includes a citrus product.

* * * * *